United States Patent
Kash et al.

(10) Patent No.: US 8,121,478 B2
(45) Date of Patent: Feb. 21, 2012

(54) METHOD AND APPARATUS FOR IMPLEMENTING NON-BLOCKING COMPUTER INTERCONNECTION NETWORK USING BIDIRECTIONAL OPTICAL SWITCH

(75) Inventors: Jeffrey Alan Kash, Pleasantville, NY (US); Laurent Schares, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 12/408,416

(22) Filed: Mar. 20, 2009

(65) Prior Publication Data

US 2010/0239266 A1   Sep. 23, 2010

(51) Int. Cl.
H04J 14/00   (2006.01)
(52) U.S. Cl. ............... 398/50; 398/48; 398/45; 398/56; 398/135; 398/140
(58) Field of Classification Search .......... 398/135, 398/140, 50, 48, 56, 55, 45
See application file for complete search history.

(56) References Cited

U.S. PATENT DOCUMENTS

| | | | |
|---|---|---|---|
| 5,812,549 A | 9/1998 | Sethu | |
| 5,884,090 A | 3/1999 | Ramanan et al. | |
| 6,337,859 B1 | 1/2002 | Goldsten et al. | |
| 6,785,438 B2 | 8/2004 | Lin et al. | |
| 6,792,174 B1 | 9/2004 | Ramaswami | |
| 6,853,763 B1 | 2/2005 | McNicol et al. | |
| 2004/0179839 A1* | 9/2004 | Tsushima et al. | 398/30 |
| 2004/0247234 A1* | 12/2004 | Young | 385/15 |
| 2006/0013207 A1 | 1/2006 | McMillen et al. | |
| 2006/0285790 A1* | 12/2006 | Young | 385/16 |
| 2007/0147846 A1 | 6/2007 | Epitaux et al. | |
| 2008/0008472 A1 | 1/2008 | Dress et al. | |
| 2008/0025288 A1 | 1/2008 | Benner et al. | |
| 2008/0037981 A1* | 2/2008 | Mukojima | 398/10 |
| 2008/0162811 A1 | 7/2008 | Steinmetz et al. | |

OTHER PUBLICATIONS

Francois Abel, et al., "Design Issues in Next-Generation Merchant Switch Fabrics," pp. 1603-1615, IEEE/ACM Transaction on Networking, vol, 15, No. 6, Dec. 2007.
Jane M. Simmons, et al., "Optical Crossconnects of Reduced Complexity for WDM Networks With Bidirectional Symmetry," pp. 819-821, IEEE Photonics Technology Letters, Volk 10, No. 6, Jun. 1998.
Kevin J. Barker, et al., "On the Feasibility of Optical Circuit Switching for High Performance Computing Systems," pp. 1-21, SC/05 Nov. 12-18, 2005, Seattle, Washington, USA.
R. Ryf, et al., 1296-port MEMS Transparent Optical Crossconnect With 2.07PETABITS/S Switch Capacity, Optical Fiber Communication Conference and Exhibit, 2001. OFC 2001 vol. 4, Issue, Mar. 17-22, 2001 pp. PD28-1-PD28-3.

* cited by examiner

Primary Examiner — Kinam Park
(74) Attorney, Agent, or Firm — F. Chau & Associates, LLC; Anne V. Dougherty, Esq.

(57) ABSTRACT

According to an embodiment of the present disclosure, a bidirectional communications system includes a first non-blocking network including a bidirectional optical switch, a plurality of nodes, a plurality of optical transceivers connected between the bidirectional optical switch and the plurality of nodes, each optical transceiver including a transmitter, a receiver and an optical combiner, and a second network connected to at least one of the nodes and the at least one at least one bidirectional optical switch for control of a cross-connect.

15 Claims, 11 Drawing Sheets

METHOD AND APPARATUS FOR IMPLEMENTING NON-BLOCKING COMPUTER INTERCONNECTION NETWORK USING BIDIRECTIONAL OPTICAL SWITCH

The invention disclosed herein was made with U.S. Government support under Contract No. H98230-07-C-0472 awarded by the U.S. Department of Defense. The Government has certain rights in this invention.

BACKGROUND

1. Technical Field

The present invention relates generally to interconnection networks for computing systems. More particularly, this invention relates to optical interconnection networks with bidirectional optical switching.

2. Discussion of Related Art

Large data centers with hundreds or thousands of nodes require scalable and high-radix switch fabrics. Electrical switch chip port count is limited by pin density, for example, to less than about 150 ports/chip. Multistage electrical network fabrics can achieve higher port counts, but suffer from high power consumption, increased latency, congestion, and high cost. Typical multistage topologies (e.g. Clos, Benes, Spanke . . . ) achieve higher port counts than the number possible with multi stage topology. These multistage technologies may use non-blocking port-count doubling (e.g., to 2n×2n) and require at least 3 n×n switches (Clos-topology), with some methods requiring 4 n×n switches (Benes-topology). While an optical switch unit can be built with higher port counts (e.g. using 3D MEMS mirror technology), the applications of the optical switch have been limited.

Therefore, a need exists for a bidirectional optical switch for various applications.

BRIEF SUMMARY

According to an embodiment of the present disclosure, a bidirectional communications system includes a first non-blocking network including a bidirectional optical switch, a plurality of nodes, a plurality of optical transceivers connected between the bidirectional optical switch and the plurality of nodes, each optical transceiver including a transmitter, a receiver and an optical combiner, and a second network connected to at least one of the nodes and the at least one at least one bidirectional optical switch for control of a cross-connect.

According to an embodiment of the present disclosure, a computer system comprising an optical circuit switch includes a first network connected to at least one optical crossconnect apparatus, a plurality of optical transceivers, each transceiver comprising a transmitter, a receiver and an optical combiner, a plurality of processing nodes interconnected by optical transceivers, and a second network comprising at least one processing node and connected to the at least one bidirectional optical crossconnect apparatus for controlling the at least one bidirectional optical crossconnect.

According to an embodiment of the present disclosure, a computer system implementing an optical circuit switch to form a non-blocking bidirectional optical switch fabric between at least two sets of nodes, includes a first network including at least one optical crossconnect apparatus, a plurality of first and second optical transceivers, each transceiver comprising a transmitter, a receiver and an optical combiner, a plurality of first nodes interconnected by the first optical transceiver, a plurality of second nodes interconnected by the second optical transceiver, and a second network comprising at least one processing node and connected to the at least one optical crossconnect apparatus for controlling the optical crossconnect apparatus.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, a bidirectional optical switch fabric uses optical signals traveling in two directions through reciprocal optical systems, such as optical fibers, waveguide and optical switches. An exemplary embodiment comprises nodes, electrical-to-optical converters with transmit and receive paths, connected to optical combiners that combine a transmit path and a receive path onto a single bidirectional optical path, which is connected to one or more optical switch elements. In such an embodiment, an optical switch fabric with n×n ports can effectively be used to connect 2n nodes. The system may include a parallel control network that is used to reconfigure the one or more optical switch elements.

According to an embodiment of the present disclosure, a bidirectional optical switch implemented in a digital communications system enables an increased number of switch ports for each switch element. The bidirectional optical switch may be used in a computer system, a single-stage switch topology, combined together with electrical switches in a switch fabric, and efficiently integrate bidirectional optical transceivers with nodes. The bidirectional switch element enables twice the number of switch ports (2n) as compared to a unidirectional switch using only one n×n bidirectional switch element. In a system implementing the bidirectional optical switch, fewer n×n switch elements are needed for any given application, which implies improvements in terms of power consumption, latency, congestion and cost. Exemplary large-scale computer systems include cloud-computing systems, stream processing systems, interne-scale datacenters, routers, etc.

According to an embodiment of the present disclosure, optical signals can simultaneously travel in both directions through reciprocal optical systems, such as optical fibers, waveguide and optical switches. In a system implementing the bidirectional optical switch fewer high-radix switches are needed to interconnect a number of nodes, which can lead to cost, power and space savings. Nodes, electrical-to-optical converters with transmit and receive paths (TX and RX, respectively), and optical combiners that combine transmit and receive paths onto a single bidirectional optical path may be connected to one or more bidirectional optical switch elements. In such an embodiment, an optical switch fabric with n×n ports can connect 2n nodes. The nodes may be client devices, central processing units, and the like. A non-blocking fabric can be constructed using a plurality of secondary optical or electrical switches between the nodes and a primary bidirectional optical switch element. Further, a parallel control network may be constructed, wherein the one or more optical switch elements can be reconfigured.

Figure 1A:
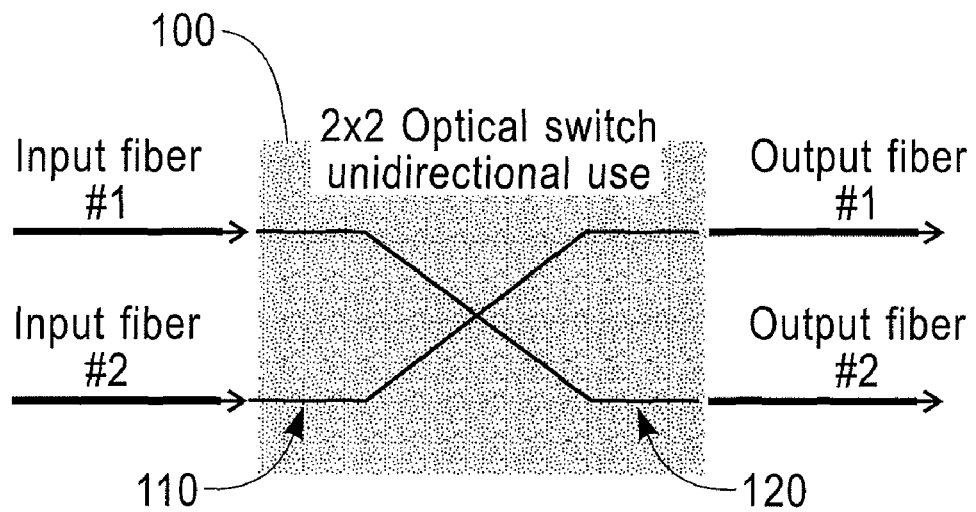
FIG. 1A is a block diagram of an optical switch according to an embodiment of the present disclosure.
Figure 1B:
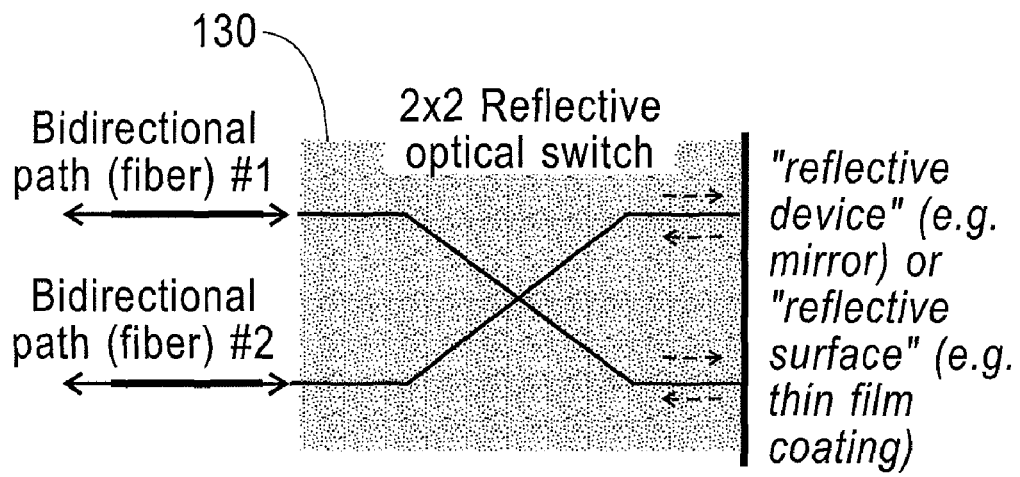
FIG. 1B is a block diagram of a bidirectional optical switch according to an embodiment of the present disclosure.

FIGS. 1A-B show optical switches for bidirectional physical-layer transport of optical signals over a single path. The optical switch element can have 'unidirectional' or 'bidirectional' embodiments. In a unidirectional optical switch 100 (see FIG. 1A), a first plurality of optical paths is connected to a first set of ports 110 on the optical switch elements (hereafter called 'input ports'), and a second plurality of optical paths are connected to a second set of ports 120 on the optical switch elements (hereafter called 'output ports'). According to an embodiment of the present disclosure, due to the reciprocal nature of the optical switch elements, the optical signals can travel simultaneously in both directions through the unidirectional optical switch. A single optical data path connecting an 'input port' to an 'output port' of the unidirectional optical switch can carry transmit data and receive data bidirectionally, simultaneously in both directions. However, an 'input port' cannot connect to another 'input port' of the unidirectional optical switch element, and an 'output port' cannot connect to another 'output port'. In a bidirectional optical switch 130 (see FIG. 1B), there is only one set of ports, and any port can directly connect to any other port.

Optical switches described in the present disclosure may be based on different technologies, including, but not limited to, two- or three-dimensional micro-electro-mechanical-system (MEMS)-mirror arrays, electro-optical switches, thereto-optical switches, switches based on mechanical or piezo-electrical beam-steering techniques, passive switch fabrics based on tunable lasers and WDM-filter elements, silicon photonic switches.

Figure 2:
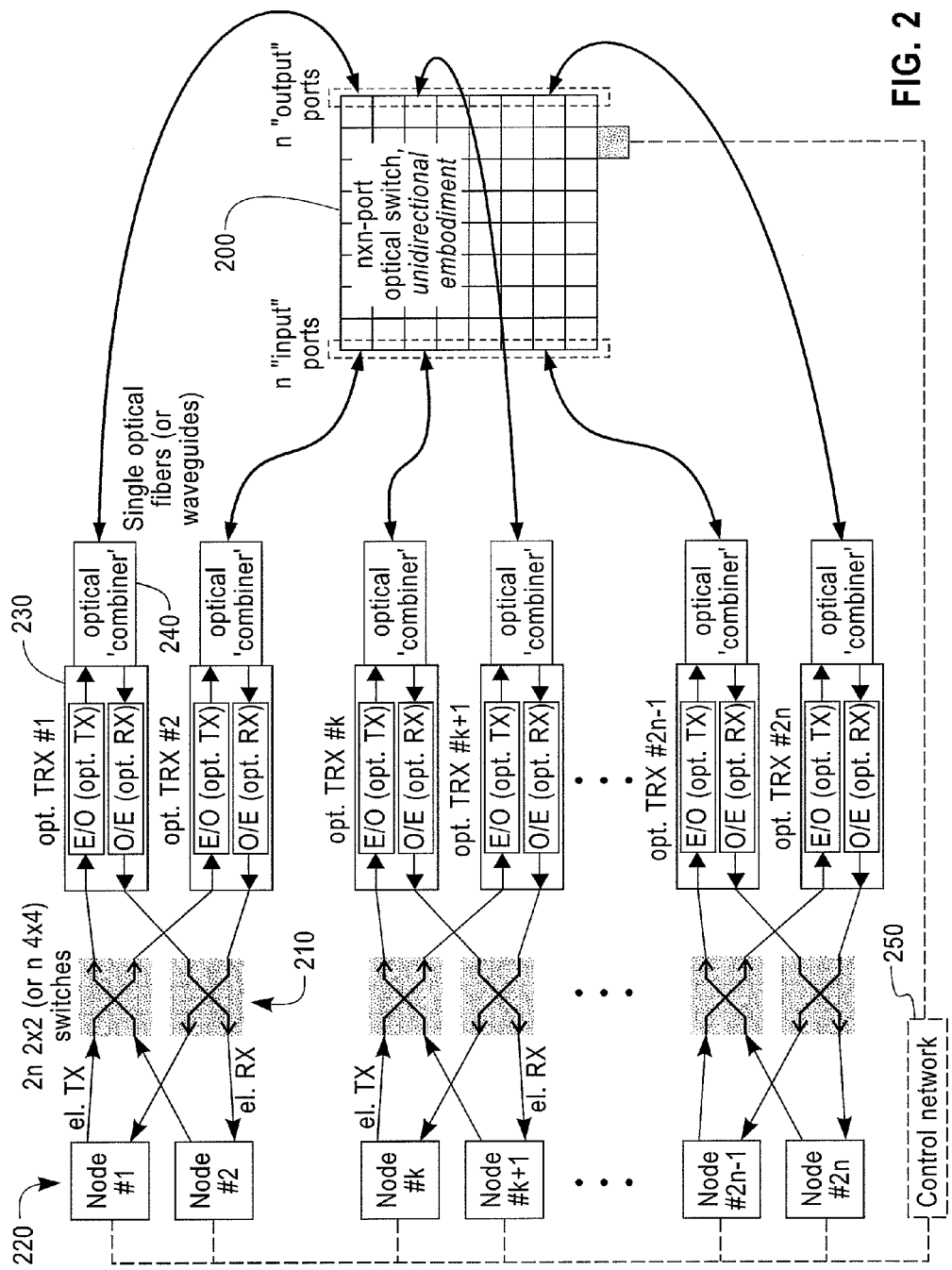
FIG. 2 is a block diagram of a computer system implementing a unidirectional optical circuit switch embodiment together with secondary switches to form a non-blocking bidirectional switch fabric according to an embodiment of the present disclosure.

FIG. 2 is a block diagram of a computer system implementing a unidirectional optical circuit switch 200 with secondary switches 210 to form a non-blocking bidirectional switch fabric according to an embodiment of the present disclosure. Groups of two nodes 220 are connected to groups of two 2×2 (or one 4×4) electrical switch elements 210 (the secondary switches). There are n groups of two nodes 220 and n groups of two 2×2 (or one 4×4) switch elements 210. The 2×2 (or 4×4) switch elements 210 are connected to optical transceivers 230, comprising one or more optical transmitter (opt. TX) and one or more optical receiver (opt. RX) channels. The optical transceivers 230 are connected to optical combiners 240 as shown in FIG. 3. A single optical fiber, carrying optical signals traveling in both directional simultaneously, connects each optical combiner 240 to an n×n-port optical switch 200 in a unidirectional embodiment. To enable a non-blocking switch fabric, one of the two optical transceivers associated to a group of two nodes is connected to the 'input port' of the optical switch element, while the second of the optical transceivers associated to the group of two nodes is connected to the 'output port' of the optical switch element. It is assumed, without loss of generality, that the optical switch element of FIG. 2 can be composed of a multi-stage network of a plurality of optical switch elements with fewer ports. This exemplary embodiment also includes a parallel control network 250, connected to one or more nodes and to the optical switches. The control network 250 is used to reconfigure the optical switch element 200.

Figure 3A:
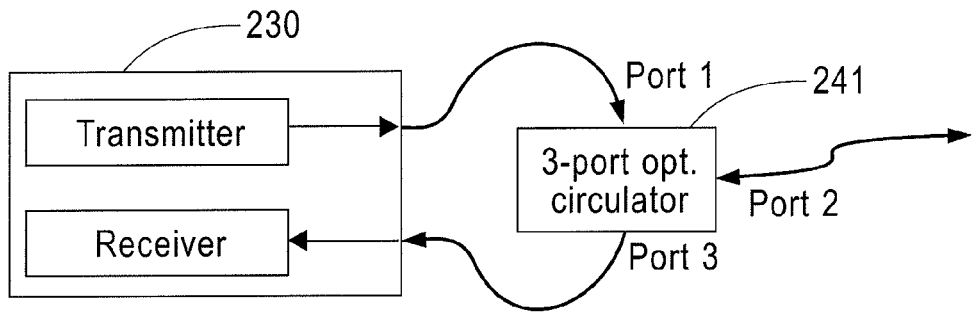
FIGS. 3A-C are block diagrams of optical combiners, including (a) a three-port optical circulator, (b) two optical isolators and an optical coupler, and (c) WDM multiplexers/demultiplexers according to exemplary embodiments of the present disclosure.
Figure 3B:
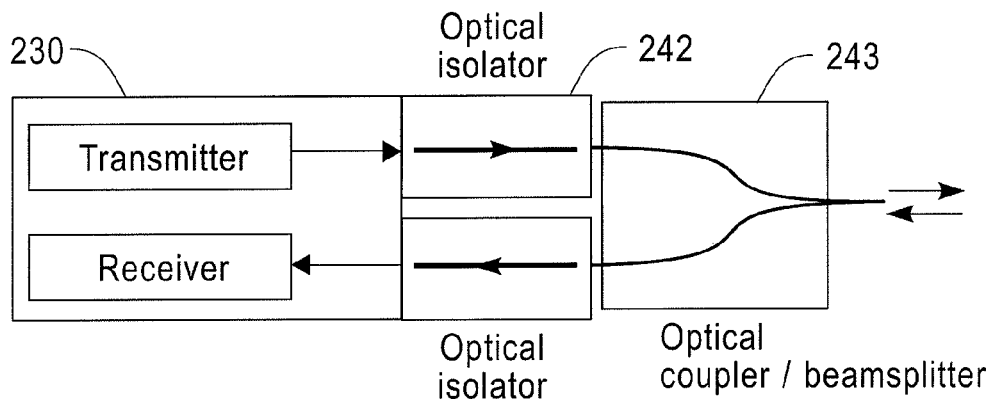
Figure 3C:
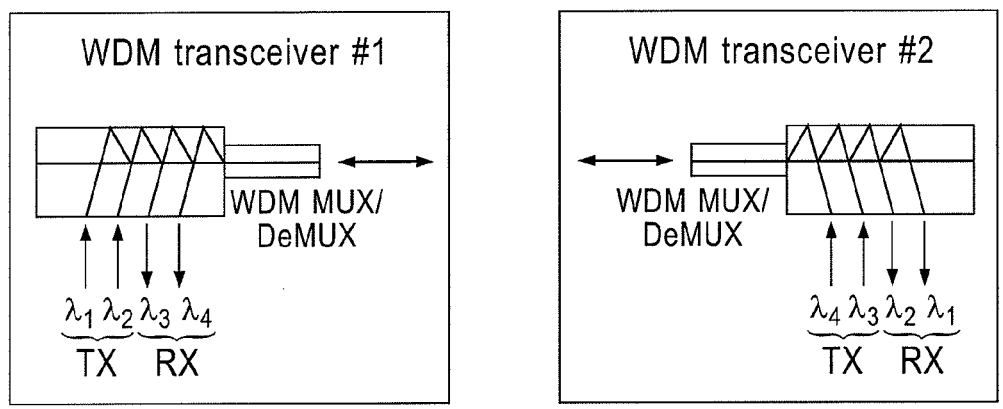

FIGS. 3A-C describe exemplary embodiments of the optical combiner 240. Optical three-port circulators 241 may be used as combiners. An optical three-port circulator 241 is a device where optical signals cannot exit through port 1 and cannot enter through port 3; the optical path is routed from port 1 to port 2, and from port 2 to port 3. In this example, on optical transmitter is connected to port 1, and an optical receiver is connected to port 3. The signals travel in both directions through the optical path connected to port 2. An alternative embodiment of an optical combiner includes two optical isolators 242 and an optical beam splitter or coupler 243. In the case of wavelength division multiplexed (WDM) signals, the optical combiner can be a WDM multiplexer or WDM demultiplexer (see FIG. 3C).

Figure 4:
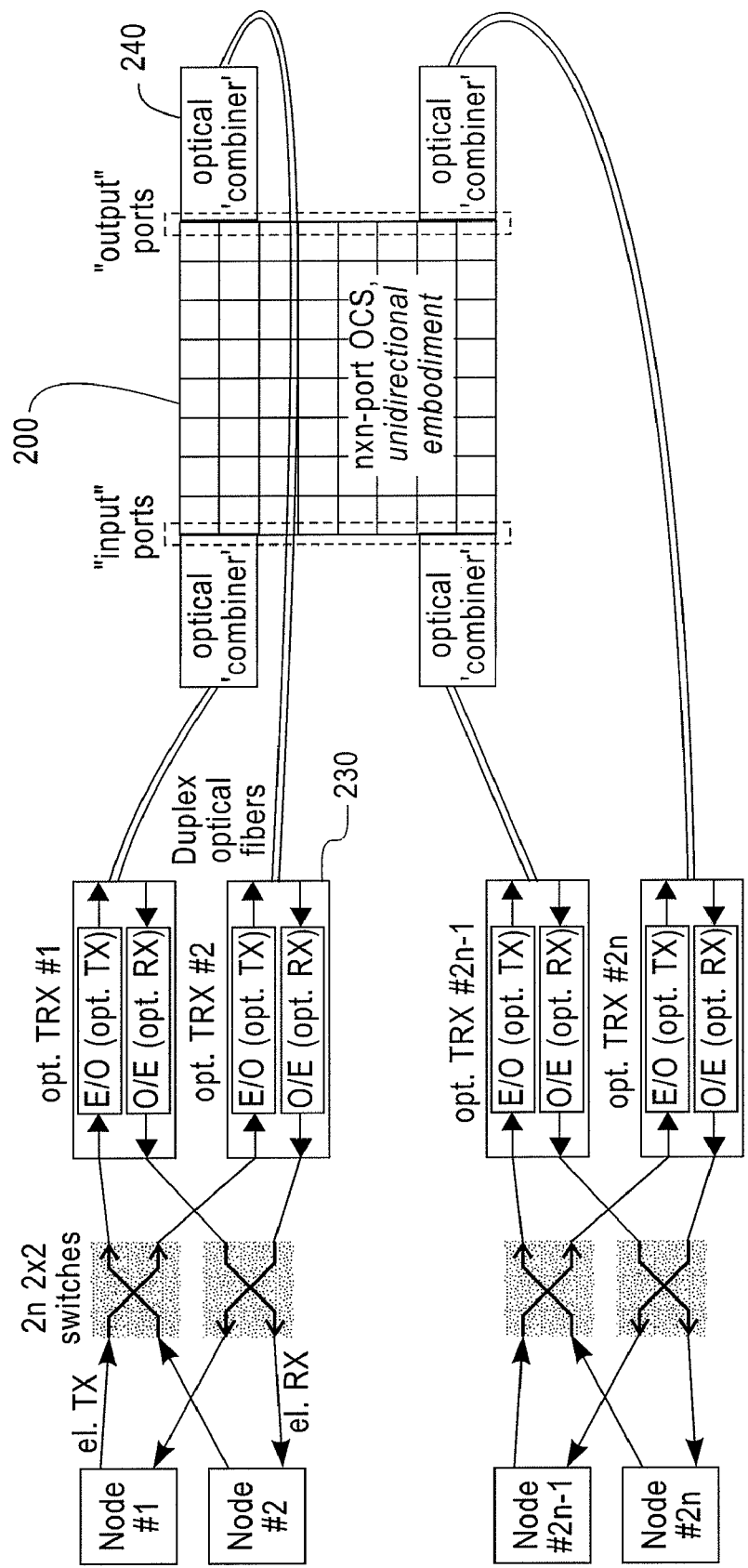
FIG. 4 is a block diagram of a computer system implementing a unidirectional optical circuit switch together with secondary switches to form a non-blocking bidirectional switch fabric according to an embodiment of the present disclosure.

FIG. 4 is a variation of the embodiment shown in FIG. 2, wherein the optical combiners 240 are attached to the optical switch 200, and a two-fiber pair connects the optical transceivers 230 to the optical combiner 240. In this case, each fiber carries unidirectional signals only, flowing from the transmitter to the combiner, respectively from the combiner to the receiver.

Figure 5:
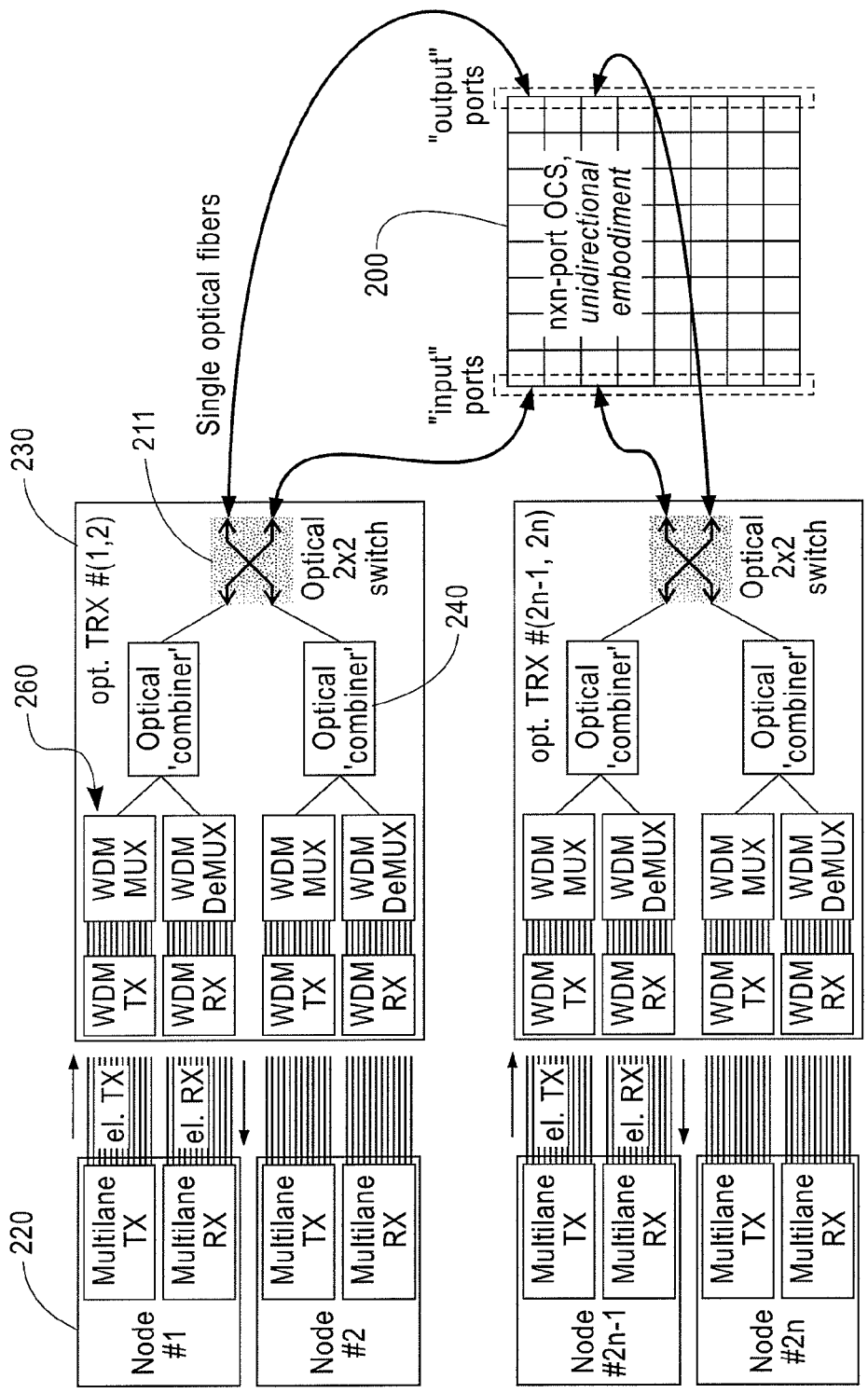
FIG. 5 is a block diagram of a computer system implementing a unidirectional optical circuit switch together with secondary optical switch elements to form a non-blocking bidirectional switch fabric according to an embodiment of the present disclosure.

FIG. 5 is another variation of the embodiment shown in FIG. 2. In FIG. 5 the secondary switches 211 are optical and are positioned between optical combiners 240, and the optical switch element 200. The optical transceiver blocks can be made of discrete components or they can be hybridly (or monolithically) integrated on single photonic integrated circuits. In the example of FIG. 5, the nodes 220 connect directly to optical transceivers 230, which in turn connect to optical combiners 240. The optical combiners 240 connect to secondary 2×2-port optical switches 211 over an optical path carrying bidirectional optical signals. One of ports of the secondary optical switches 211 connects over a single fiber or waveguide to an 'input port' of the primary optical switch. The second port of the secondary optical switches 211 connects over a single fiber or waveguide to an 'output port' of the primary optical switch. The optical transceivers 230 may or may not use wavelength division multiplexing (WDM). For a case using WDM, WDM multiplexer/demultiplexer blocks 260, the blocks are disposed between the optical transceivers 230 and optical combiners 240.

Figure 6:
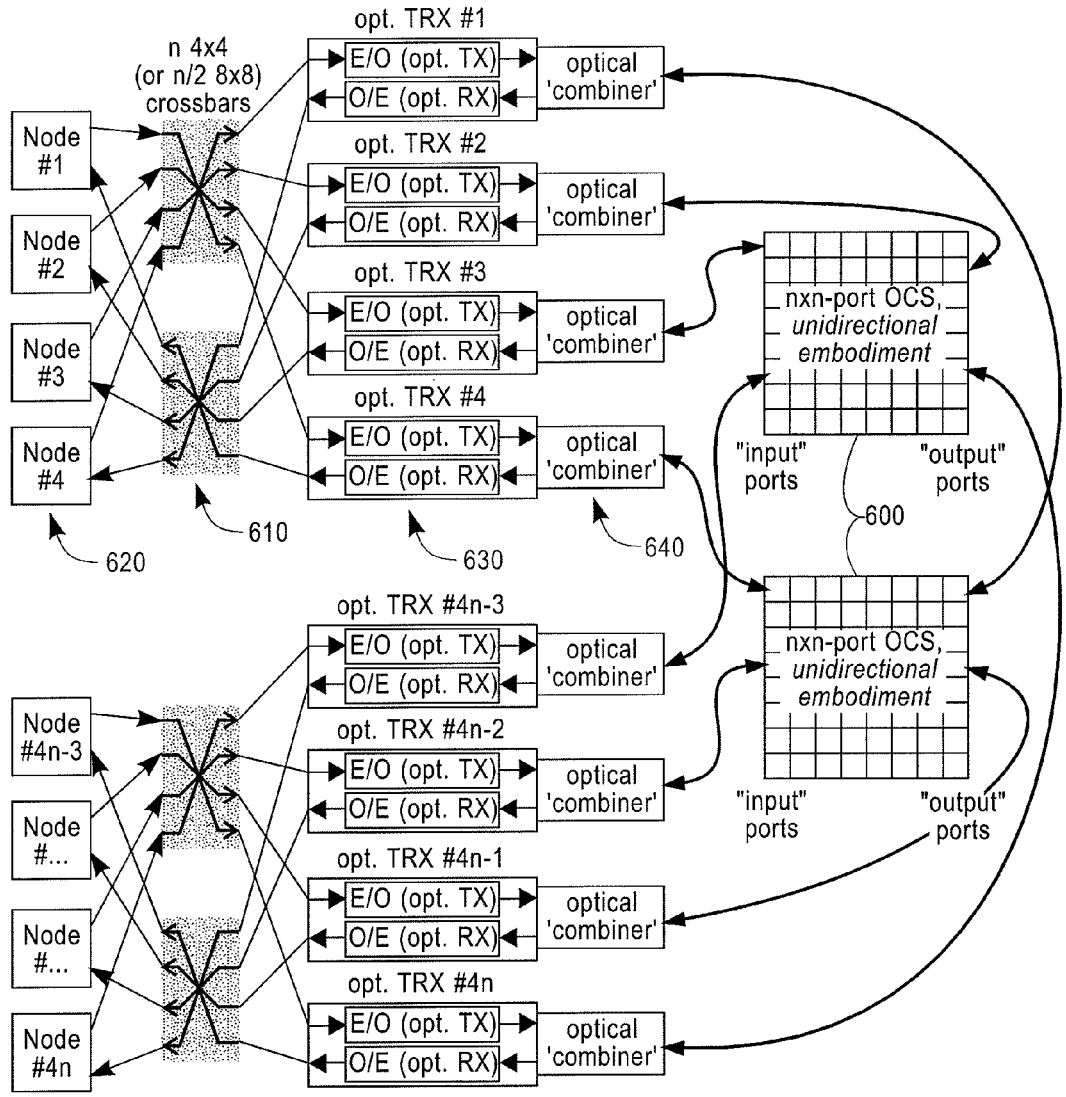
FIG. 6 is a block diagram of a computer system implementing two unidirectional optical circuit switch together with secondary switches to form a non-blocking bidirectional switch fabric according to an embodiment of the present disclosure.

Embodiments described above use a single nxn-port optical switch in combination with smaller secondary switches to double the port count of nodes (to 2n), which can be connected with a single nxn-port switch. FIG. 6 shows a structure interconnecting 4n nodes 620 with two nxn-port optical switches 600 according to an exemplary embodiment of the present disclosure. Groups of four nodes are connected to groups of two 4×4-port (or one 8×8-port) electrical switch elements 610. There are n groups of four nodes 620 and n groups of two 4×4-port (or one 8×8-port) switch elements 610. The 4×4 (or 8×8) switch elements 610 are connected to optical transceivers 630, comprising one or more optical transmitter and one or more optical receiver channels. The optical transceivers 630 are connected to optical combiners 640. A single optical fiber, carrying optical signals traveling in both directional simultaneously, connects each optical combiner 640 to nxn-port optical switches 600 in a unidirectional embodiment. To enable a non-blocking switch fabric, one of the four optical transceivers 630 associated to a group of four nodes 620 is connected to the 'input port' of a first optical switch element, while a second optical transceiver associated to the group of four nodes is connected to the 'output port' of the first optical switch element. A third optical transceiver associated to the group of four nodes is connected to the 'input port' of a second optical switch element, and a forth optical transceiver associated to the group of four nodes is connected to the 'output port' of the second optical switch element. A parallel control network (not shown) is connected to one or more nodes and to the optical switches. This control network is used to reconfigure the optical switch elements.

Figure 7:
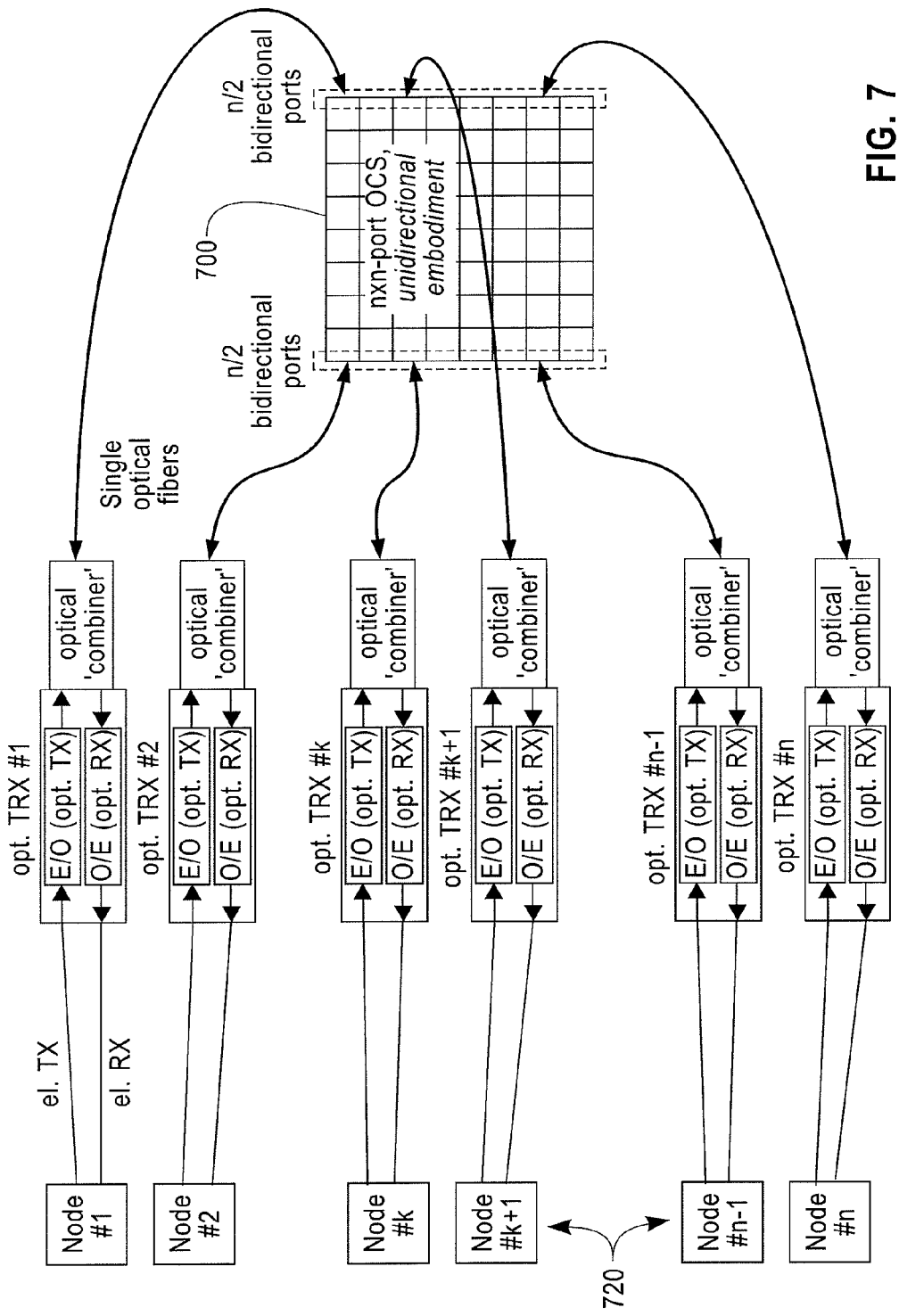
FIG. 7 is a block diagram of a computer system implementing a bidirectional optical circuit switch to form a non-blocking bidirectional optical switch fabric according to an embodiment of the present disclosure.

FIG. 7 is a block diagram of a computer system implementing a bidirectional optical circuit switch 700, as shown in FIG. 1, to form a non-blocking bidirectional optical switch fabric. In FIG. 7 2n nodes 720 are connected with a single nxn-port bidirectional optical circuit switch 700, without the need for secondary switches.

Figure 8A:
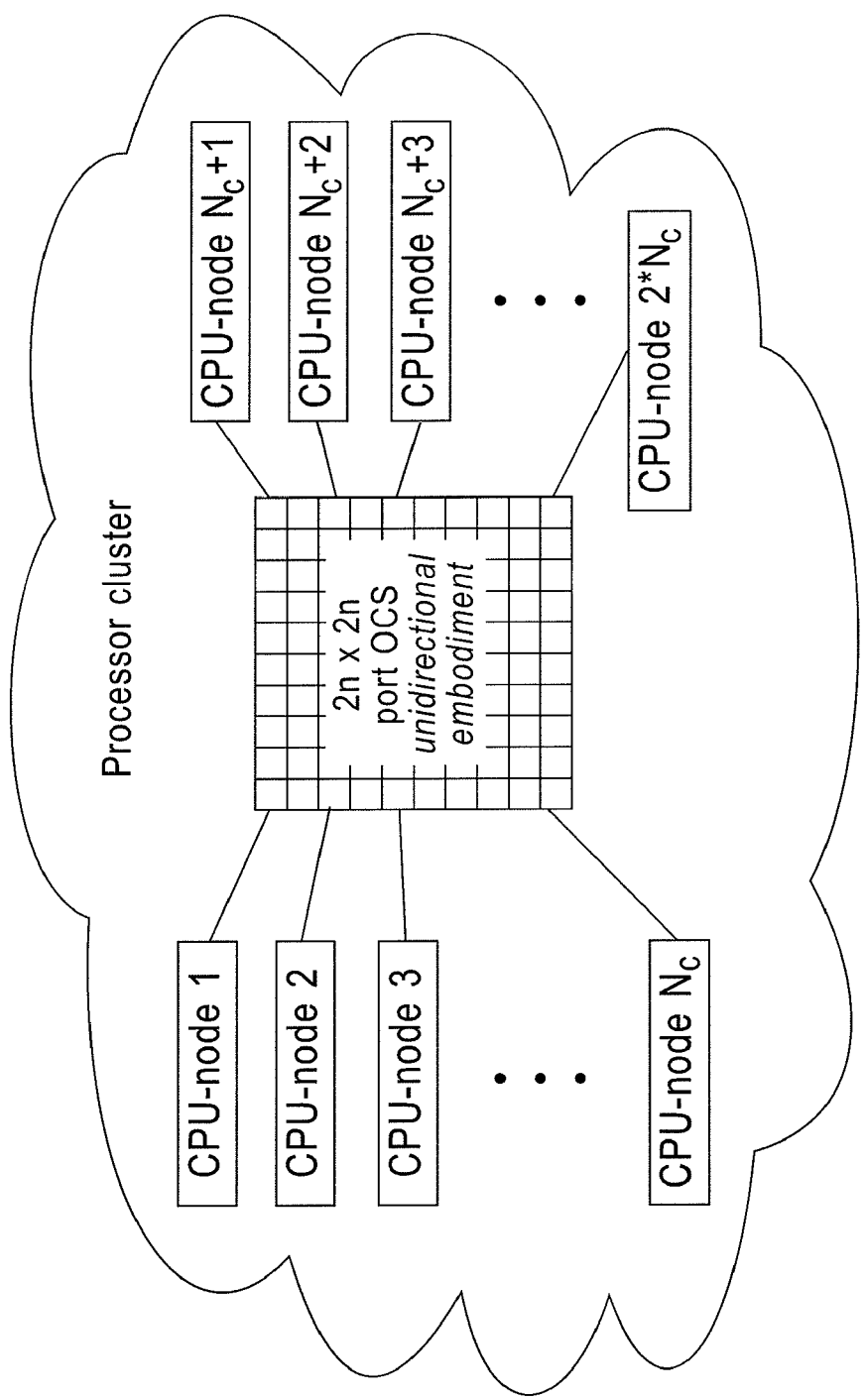
FIGS. 8A-B illustrate respective methods to interconnect 2n identical nodes with a non-blocking network according to exemplary embodiments of the present disclosure.
Figure 8B:
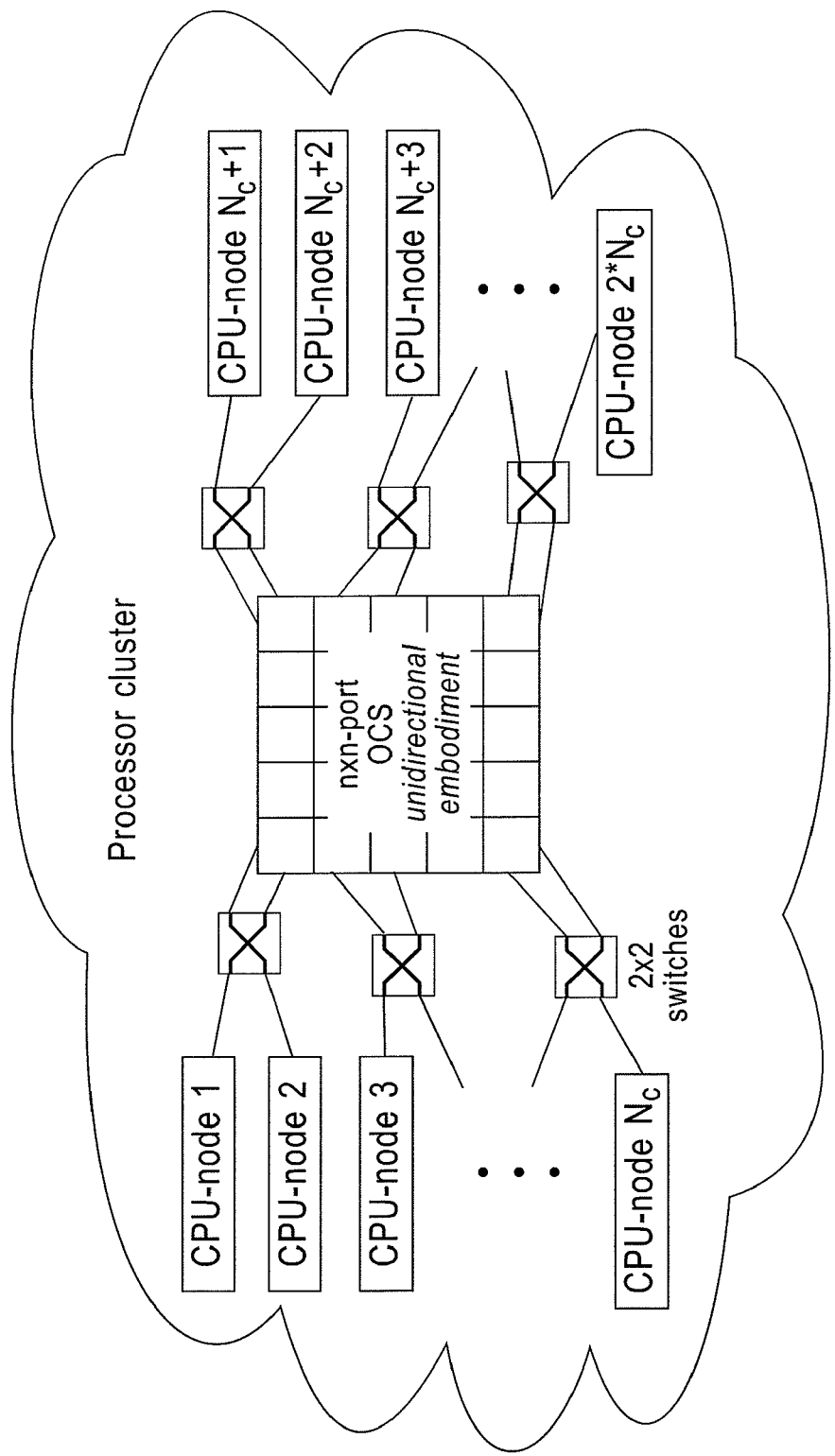

FIGS. 8A-B illustrates respective methods to interconnect 2n identical nodes with a non-blocking network. A 'homogeneous system' is a system where all the nodes are of the same type. To interconnect 2n identical nodes with a non-blocking crossbar fabric, a 2n×2n switch may be used as shown in FIG. 8A, or a three-stage fabric with local 2×2 switches and a central nxn bidirectional optical switch can be used as shown in FIG. 8B.

Figure 9A:
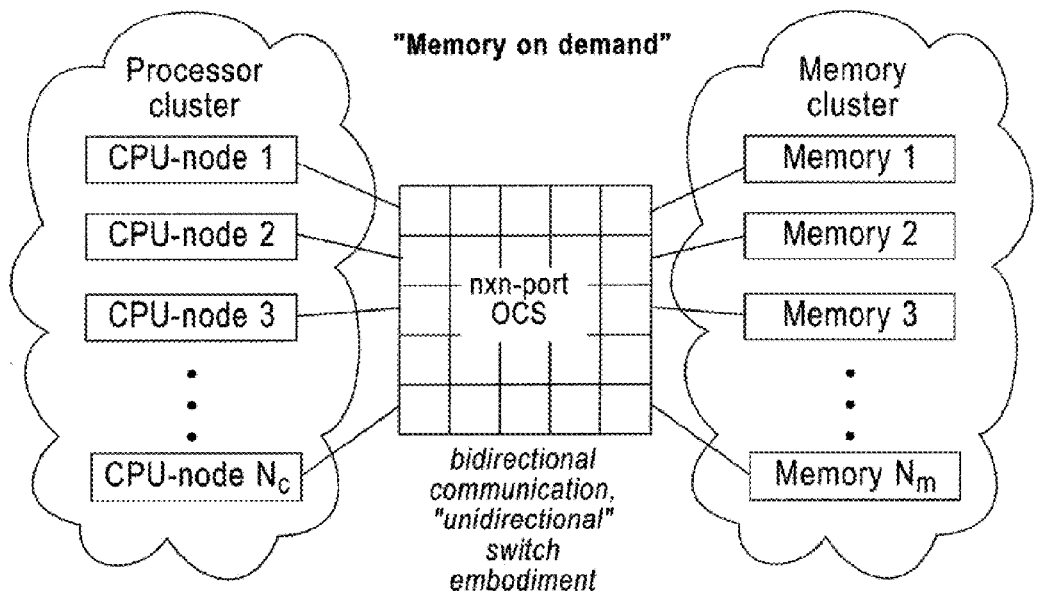
FIGS. 9A-B show interconnected sets of n different nodes each with a non-blocking network using a single n×n-port switch in a unidirectional switch fabric according to an embodiment of the present disclosure.

In the diagrams of FIG. 8, the unit 'CPU-node #k' contains both the node itself, the optical transceiver, and the optical 'combiner'. FIG. 9A uses a single (2n)×(2n)-port switch to interconnect 2n nodes. FIG. 8b uses a nxn-port switch together with a plurality of 2×2-port secondary switches to form this non-blocking network.

Figure 9B:
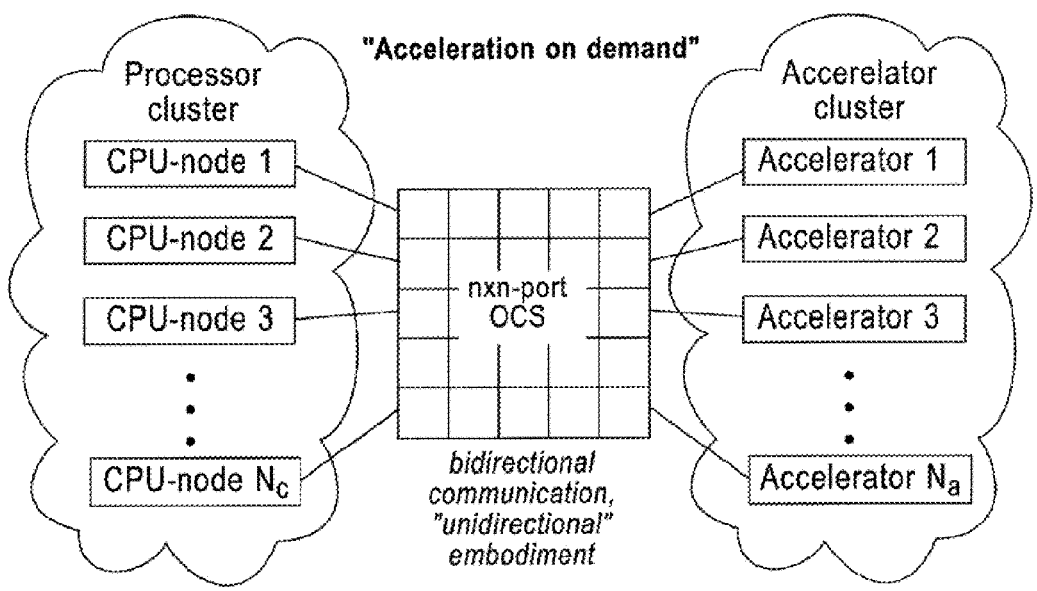

FIGS. 9A-B illustrate an interconnection of two sets of n different nodes each with a non-blocking network using a single nxn-port switch in a unidirectional embodiment. Any node from the first set can connect to any node from the second set. The nxn-port switch is not used to interconnect the nodes within each set among themselves. A 'hybrid system' is a system with different types of nodes. For example, interconnects between (1) a processor cluster and a memory cluster (see FIG. 9A), (2) a processor cluster and an accelerator cluster (see FIG. 9B), or (3) a processor cluster and a switch cluster may be implemented. To interconnect two different sub-clusters using the bidirectional paradigm of this invention, each with n identical nodes, with a non-blocking crossbar fabric, a single nxn-port optical switch may be used to interconnect a total of 2n nodes (n nodes in first and n nodes in the second subcluster) without a multi-stage fabric.

The unit ' . . . -node k' contains both the respective node (processor, memory, accelerator, switch) itself, as well as the optical transceiver, and the optical 'combiner'. This assumes that the nodes in each subcluster either do not need connectivity among themselves or have a separate fabric inside the subcluster.

Figure 10:
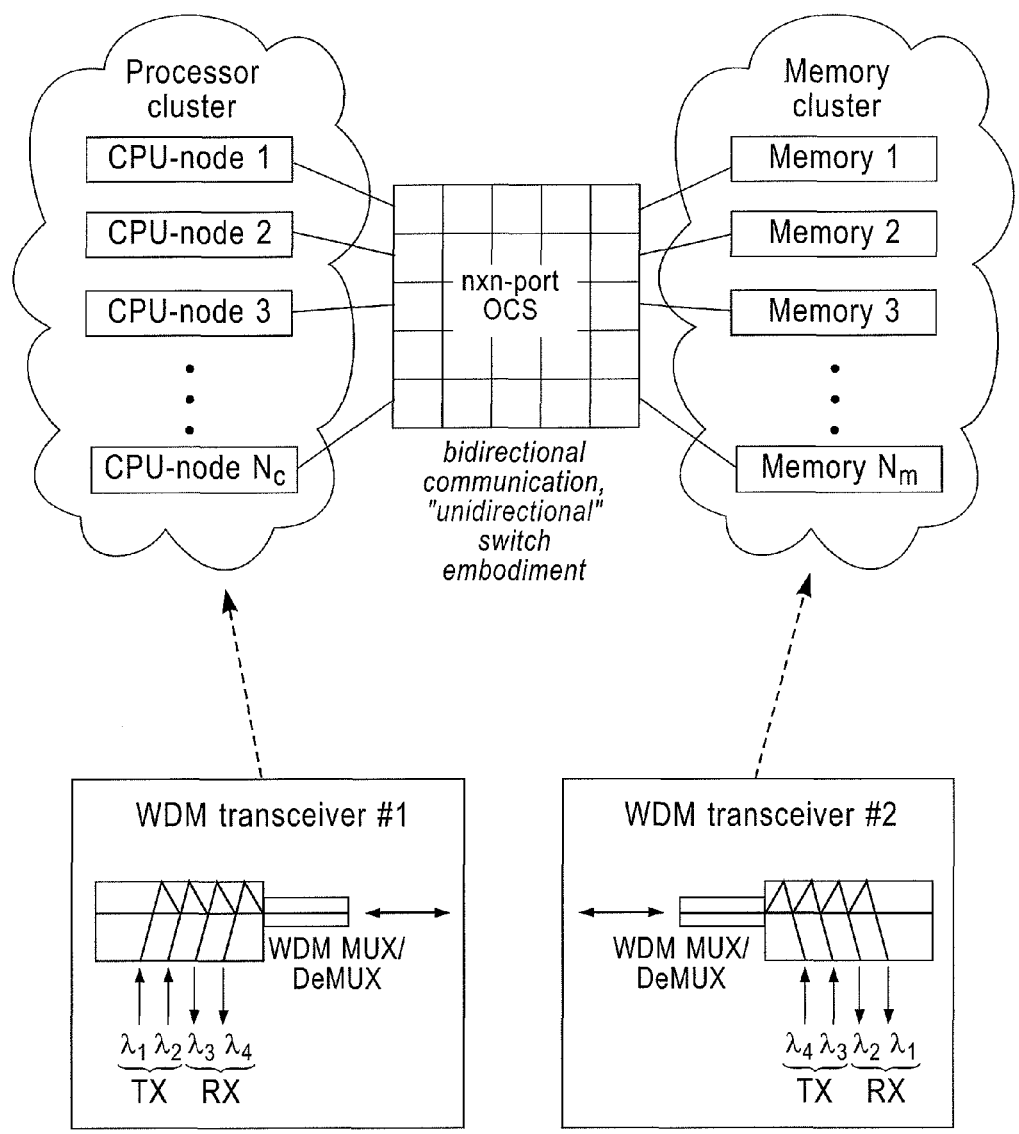
FIG. 10 is a block diagram of a computer system implementing a unidirectional optical circuit switch to form a non-blocking bidirectional optical switch fabric between two sets of different nodes according to an embodiment of the present disclosure.

FIG. 10 is a block diagram of a computer system implementing a unidirectional optical circuit switch to form a non-blocking bidirectional optical switch fabric between two sets of different nodes with different WDM transceivers being used for first set of nodes than for the second set of nodes according to an embodiment of the present disclosure. The use of two different WDM transceivers in the subclusters of a hybrid system allows for the omission of optical isolators and the use of only WDM MUX/DeMUX technology. WDM optical multiplexers and demultiplexers exist in integrated waveguide form can be designed for small footprint and low insertion loss. In FIG. 10 two variations of WDM transceivers are shown with a total of L wavelengths. WDM transceiver #1, used in a first subcluster of nodes, includes a transmitter with wavelengths $\lambda_1$ to $\lambda_{L/2}$, and a receiver with wavelengths $\lambda_{L/2+1}$ to $\lambda_L$. WDM transceiver #2, used in the second sub cluster of nodes, includes a receiver with wavelengths $\lambda_1$ to $\lambda_{L/2}$, and a transmitter with wavelengths $\lambda_{L/2+1}$ to $\lambda_L$.

While the present disclosure includes descriptions of exemplary embodiments, it will be understood by those skilled in the art that various changes may be made and equivalents may be substituted for elements thereof without departing from the scope of the present disclosure. In addition, many modifications may be made to adapt a particular situation or material to the teachings of the invention without departing from the essential scope thereof. Therefore, it is intended that the present disclosure not be limited to exemplary embodiments as the best mode contemplated for carrying out this invention, but will include all embodiments falling within the scope of the appended claims.

What is claimed is:

1. A bidirectional communications system, comprising:
   a first non-blocking network comprising a bidirectional optical switch;
   a plurality of nodes;
   a plurality of optical transceivers connected between the bidirectional optical switch and the plurality of nodes, each optical transceiver comprising a transmitter, a receiver and an optical combiner; and
   a second network connected to at least one of the nodes and the at least one bidirectional optical switch for control of a crossconnect.

2. The bidirectional communications system of claim 1, wherein each optical transceiver is connected to at least one node of the plurality of nodes via a secondary switch, wherein the each optical transceiver interconnects a sub cluster with the at least one of the plurality of nodes and the secondary switches over the first network using bidirectional optical links.

3. The bidirectional communications system of claim 2, wherein a first half of the bidirectional optical links from each secondary switch are connected to input ports of the bidirectional optical switch, and a second half of the bidirectional optical links from each secondary switch are connected to the output ports of the bidirectional optical switch.

4. The bidirectional communications system of claim 1, wherein the second network controls a configuration of the bidirectional optical switch.

5. The bidirectional communications system of claim 1, wherein the optical combiner is a 3-port optical circulator comprising two ports in communication with a respective optical transceiver and one port in communication with the bidirectional optical switch.

6. The bidirectional communications system of claim 1, wherein the optical combiners are connected directly to respective input and output ports of the bidirectional optical switch.

7. The bidirectional communications system of claim 1, wherein the optical combiners are connected directly to respective optical transceivers.

8. The bidirectional communications system of claim 1, further comprising optical isolators are connected to respective optical transceivers.

9. A computer system comprising an optical circuit switch, comprising:
- a first network connected to at least one optical crossconnect apparatus;
- a plurality of optical transceivers, each transceiver comprising a transmitter, a receiver and an optical combiner;
- a plurality of processing nodes interconnected by optical transceivers; and
- a second network comprising at least one processing node and connected to the at least one bidirectional optical crossconnect apparatus for controlling the at least one bidirectional optical crossconnect.

10. The computer system of claim 9, wherein the optical transceivers are connected to the processing nodes and the optical transceivers interconnect the processing nodes over the first network using the optical combiners connected to bidirectional optical links.

11. The computer system of claim 10, wherein the optical circuit switch is a bidirectional optical switch.

12. A computer system implementing an optical circuit switch to form a non-blocking bidirectional optical switch fabric between at least two sets of nodes, comprising:
- a first network including at least one optical crossconnect apparatus;
- a plurality of first and second optical transceivers, each transceiver comprising a transmitter, a receiver and an optical combiner;
- a plurality of first nodes interconnected by the first optical transceiver;
- a plurality of second nodes interconnected by the second optical transceiver; and
- a second network comprising at least one processing node and connected to the at least one optical crossconnect apparatus for controlling the optical crossconnect apparatus.

13. The computer system of claim 12, where the optical crossconnect apparatus is a unidirectional switch.

14. The computer system of claim 12, where the optical combiners are wavelength division multiplexers/demultiplexers.

15. The computer system of claim 14, where:
- a transmitter of the first optical transceiver operates on a set of first wavelengths;
- a receiver of the first optical transceiver operates on a set of second wavelengths;
- a transmitter of the second optical transceiver operates on the set of second wavelengths; and
- a receiver of the second optical transceiver operate on a set of first wavelengths, wherein the first wavelengths are different from the second wavelengths.

* * * * *